Jan. 11, 1938. W. S. SAUNDERS 2,104,768
STORAGE BATTERY INSTALLATION
Filed Aug. 21, 1936 2 Sheets-Sheet 1

INVENTOR
WALTER S. SAUNDERS
BY
ATTORNEYS

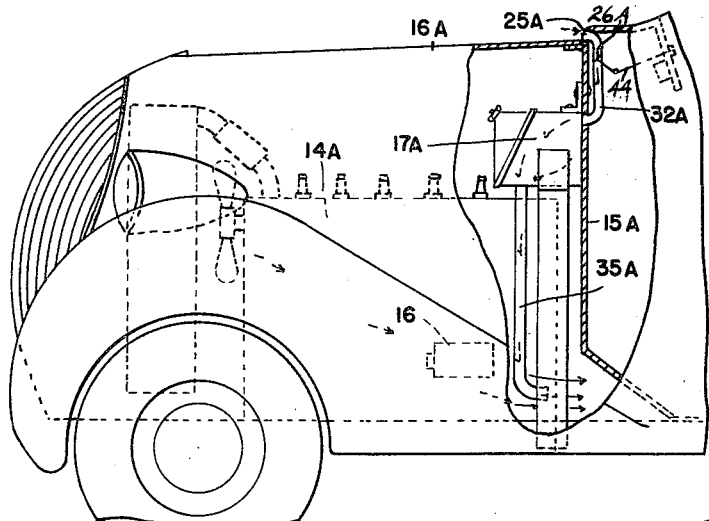
FIG. 7.
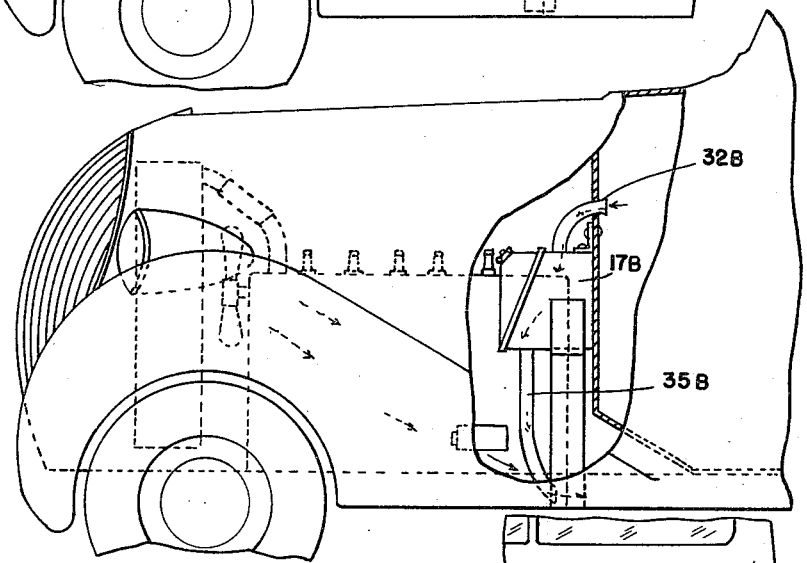
FIG. 9.
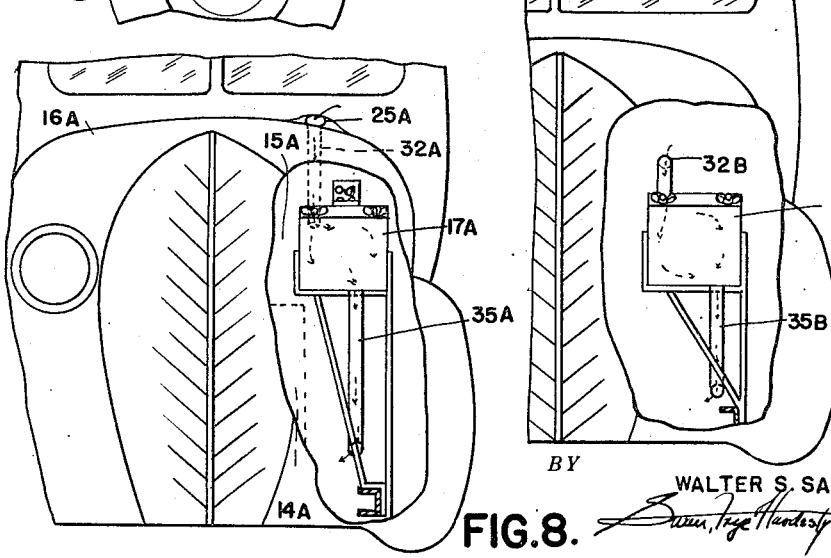
FIG. 10.
FIG. 8.

Patented Jan. 11, 1938

2,104,768

UNITED STATES PATENT OFFICE 2,104,768

STORAGE BATTERY INSTALLATION

Walter S. Saunders, Pontiac, Mich., assignor to The American Forging and Socket Company, Pontiac, Mich., a corporation of Michigan Application August 21, 1936, Serial No. 97,211

3 Claims. (Cl. 180—68.5)

This invention relates to the installation of storage batteries in automobiles and other vehicles, and is particularly directed to improving the constructions disclosed in my copending application Serial Number 64,909 filed February 20, 1936, and to the provision of improved means whereby the storage battery of an automobile may be installed in close proximity to the engine, and, if desired, directly in the engine compartment, yet ventilated in such manner that the battery can not be harmfully affected by the heat of the engine, while the tendency of the battery to overheat from other causes, such as the severe drains and charging rates to which such batteries are now commonly subjected, is reduced by the cooling effect of the ventilating means, which ventilating means also dilutes and sweeps away the acid fumes emanating from the battery.

The invention also contemplates among important objects the provision of such venting means in novel and inexpensive form, incorporating a concealed air inlet located beneath one of the fenders of the vehicle, or in other hidden position, and so arranged that the unwanted entry of dirt, water and other foreign matter into the battery case by way of the ventilating means is prevented, without the necessity of utilizing special filtering or baffling means for such purpose.

Another important object resides in the provision of improved means for withdrawing exhaust air from such a ventilated battery box, and so inducing an inflow regardless of the presence or absence of pressure at the inlet.

Other objects and advantages will be apparent from the following description, wherein reference is made to the accompanying drawings illustrating preferred embodiments of my invention, and wherein similar reference numerals designate similar parts throughout the several views.

Figure 1:
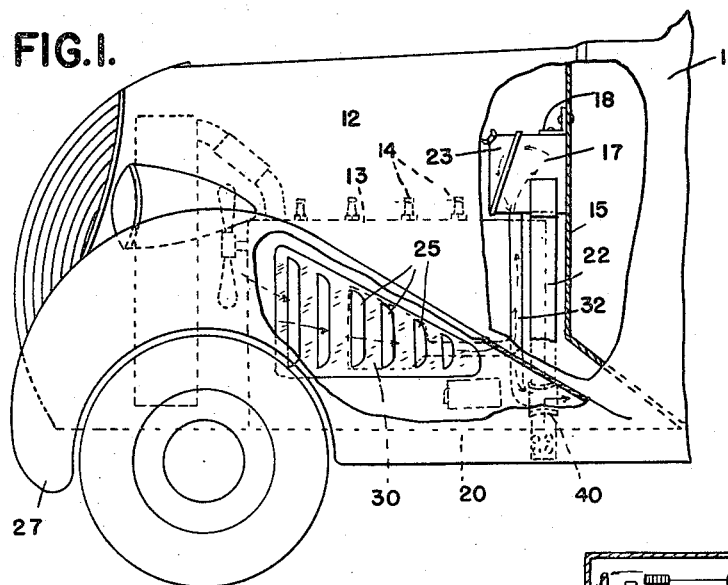
Figure 1 is a somewhat diagrammatic fragmentary elevational view of a front portion of an automobile equipped with a storage battery installation incorporating the principles of this invention.
Figure 3:
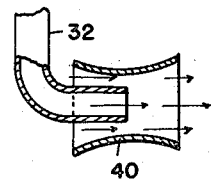
Figure 3 is a detailed view on a larger scale, partly in section and partly in side elevation, of the exhaust draft-inducing portion.
Figure 2:
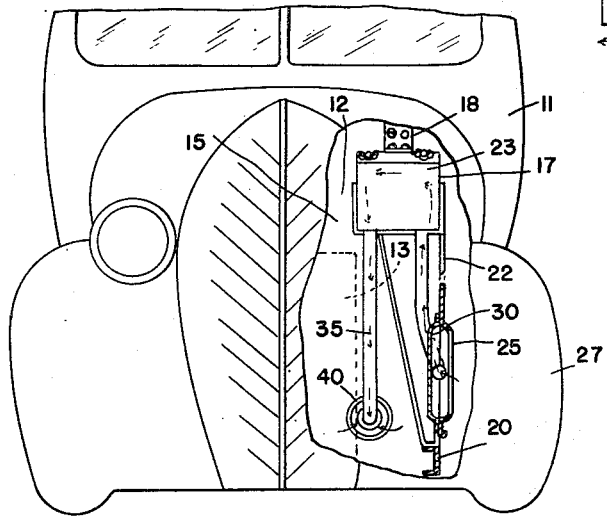
Figure 2 is a front elevational view, partly broken away, of the vehicle and battery installation.
Figure 6:
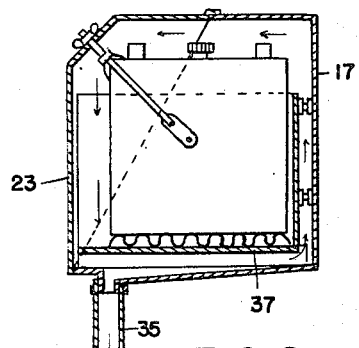
Figure 6 is a cross section thereof taken substantially on the line 6—6 of Figure 5 and looking in the direction of the arrows.

Figures 7 and 8 are side and front elevational views respectively, similar to Figures 1 and 2, of a somewhat modified installation, and Figures 9 and 10 are analogous side and front elevational views of a further modification.

Referring now to the drawings: Reference character 11 designates the body portion of a motor car, shown as having at its front end an engine compartment 12, separated from the passenger compartment (undesignated) by a dash panel 15, against which, in the illustrative embodiment shown, the battery box 17 is supported, the box being secured to the dash as by means of an angle bracket 18, and preferably also braced from the frame 20 as by uprights 22. The front of the box is closed by a removable cover 23, which when removed exposes a part of the top of the battery, and when attached encloses it tightly. Appurtenant the engine 13 are electrically operable elements including spark plugs 14 and the electric starter 16.

Figure 4:
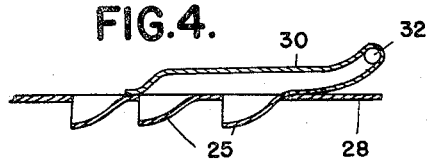
Figure 4 is a fragmentary longitudinal section of the special inlet louvers and inlet conduit portion attached thereto.
Figure 5:
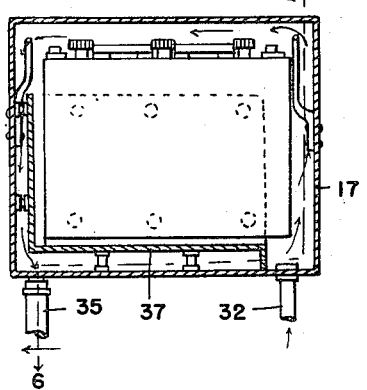
Figure 5 is a longitudinal sectional elevational view of the battery case, showing in side elevation the battery installed therein.

Air is conducted into the box from inlet louvers 25, the shape of which is best shown in Figure 4. These project from the side of the engine compartment into the open air in a position beneath and hidden by the front fender 27. A hood 30 is provided covering the louvers on the inside, and a conduit 32 is connected to the hood 30 and extends upwardly therefrom to the battery box 17, into the bottom of which it discharges the air scooped from the airstream by the louvers.

From the opposite end of the box at the bottom an air discharge conduit 35 extends downwardly to a position in the air stream flowing around and beneath the motor, and is provided with an opening directed rearwardly of such air stream. Combined baffle and supporting portions, as 37, inside the box, act to force air flowing from the inlet to the outlet to travel entirely around the battery. At its lower extremity the air discharge conduit 35 is bent rearwardly, and the tendency of the air flowing therepast to create a reduced pressure zone directly behind the open end of the conduit may be augmented by a Venturi shaped shroud 40 encircling and spaced from the end of the pipe.

In the modified construction shown in Figures 7 and 8, in which like parts have been given similar reference numerals to those employed in the description of the first embodiment, distinguished by the addition of the letter "A" to each, the battery box 17A is similarly supported on the dash panel 15A above the engine 14A, and the air inlet pipe 32A is extended into the back of the box through the dash panel, from a position inside the passenger compartment. The inlet 25A opens forwardly, its mouth being arranged in a shouldered area provided for the purpose by an upward extension of the dash, located above the engine hood 16A. A discharge conduit 25A is extended downwardly in like fashion to such position in the air stream below or around the motor that the air flow thereabout tends to draw the air from the rearwardly directed opening of the conduit and so augment the circulation of ventilating air. A damper-like valve 26A is provided for cutting off the air flow, operable from the instrument panel, as by the pull rod 44.

In the further modification shown in Figures 9 and 10 the inlet conduit 32B is disposed somewhat similarly to the inlet conduit 32A of the embodiment last described, but simply extended through the dash to the interior of the passenger compartment, from which it draws air. The inlet tube 32B enters the engine compartment above the case 17B and projects into the top of the latter, while from the bottom of the box the air discharge tube 35B similarly projects to a position facilitating eduction of air therefrom by the air flow about its end.

While it will be apparent from the foregoing description that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In combination with an automotive vehicle incorporating electrically operable elements and including a frame, an engine compartment, an engine mounted in the engine compartment, a hood portion bounding the engine compartment, a mudguard lying beside and outside said hood portion and engine compartment, one or more of said electrically operable elements being appurtenant the engine, a storage battery for supplying current to said electrically operable elements, and means for supporting and ventilating said battery including a box arranged adjacent the engine and substantially enclosing the battery, the box having air inlet and outlet portions, and means for introducing air into the box including forwardly directed air-scooping means arranged in said hood portion beneath the mudguard and substantially below the box, and an air inlet conduit extending upwardly from said air scooping means to the box.

2. Battery supporting and ventilating means as set forth in claim 1 in which said box is arranged in an elevated position in said engine compartment, whereby foreign matter entering the inlet conduit tends to run therefrom under the force of gravity, and means for augmenting the circulation-inducing effect of the air scooping means comprising air outlet means extending from the box into the air stream and extending and opening in the direction of such air stream to constitute air ejecting means.

3. Apparatus as set forth in claim 1 including an air discharge conduit extending from said box to a position in the airstream, and means including a Venturi element for inducing an airflow from said conduit.

WALTER S. SAUNDERS.